US009678393B2

(12) United States Patent
Xie et al.

(10) Patent No.: US 9,678,393 B2
(45) Date of Patent: Jun. 13, 2017

(54) LIQUID CRYSTAL DISPLAY PANEL, DISPLAY APPARATUS AND METHOD FOR DRIVING THE DISPLAY APPARATUS

(71) Applicant: BOE TECHNOLOGY GROUP CO., LTD., Beijing (CN)

(72) Inventors: Chang Xie, Beijing (CN); Jianshe Xue, Beijing (CN); Jaegeon You, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 120 days.

(21) Appl. No.: 14/436,965

(22) PCT Filed: Jul. 17, 2014

(86) PCT No.: PCT/CN2014/082424
§ 371 (c)(1),
(2) Date: Apr. 20, 2015

(87) PCT Pub. No.: WO2015/062310
PCT Pub. Date: May 7, 2015

(65) Prior Publication Data
US 2016/0018704 A1    Jan. 21, 2016

(30) Foreign Application Priority Data
Oct. 29, 2013    (CN) .......................... 2013 1 0522636

(51) Int. Cl.
*G02F 1/1343*      (2006.01)
*G02F 1/1362*      (2006.01)
(Continued)

(52) U.S. Cl.
CPC ........ *G02F 1/134309* (2013.01); *G02F 1/137* (2013.01); *G02F 1/1368* (2013.01);
(Continued)

(58) Field of Classification Search
CPC ........ G02F 2001/134381; G02F 2001/134318; G02F 1/134363; G02F 1/13624
See application file for complete search history.

(56) References Cited

U.S. PATENT DOCUMENTS 7,369,204 B1\*    5/2008    Choi ................. G02F 1/134363
                                                       349/130
2010/0103085 A1\*  4/2010    Lee .................. G02F 1/134363
                                                        345/92
(Continued)

FOREIGN PATENT DOCUMENTS

CN    1877430 A    12/2006
CN    1971349 A    5/2007
(Continued)

OTHER PUBLICATIONS

Third Chinese Office Action in Chinese Application No. 201310522636.8, mailed May 31, 2016 with English translation.
(Continued)

*Primary Examiner* — Kendrick Hsu
(74) *Attorney, Agent, or Firm* — Collard & Roe, P.C.

(57) ABSTRACT

A liquid crystal display (LCD) panel, a display apparatus and a method for driving the display apparatus capable of providing a LCD panel having good display quality are provided. The liquid crystal display panel comprises: a first substrate (11) and a second substrate (21) opposite to each other, a pixel array provided on the first substrate (11), and a liquid crystal layer (3) between the first substrate (11) and the second substrate (21). The liquid crystal display panel further comprising a first common electrode (12) disposed on a side of the first substrate (11) close to the liquid crystal layer (3) and a second common electrode (22) disposed on a side of the second substrate (21) close to the liquid crystal layer (3). A first pixel electrode (1) and a second pixel electrode (2) are disposed on the first substrate (11). The
(Continued)

second common electrode (22) has no overlap region directly facing the first pixel electrode (1) and/or the second pixel electrode (2).

20 Claims, 5 Drawing Sheets

(51) Int. Cl.
  *G02F 1/1368* (2006.01)
  *G02F 1/137* (2006.01)
(52) U.S. Cl.
  CPC ...... *G02F 1/13439* (2013.01); *G02F 1/13624* (2013.01); *G02F 1/134363* (2013.01); *G02F 2001/134318* (2013.01); *G02F 2001/134345* (2013.01); *G02F 2001/134381* (2013.01)

(56) References Cited

U.S. PATENT DOCUMENTS

| | | | |
|---|---|---|---|
| 2011/0273638 A1* | 11/2011 | Tsai | G02F 1/137 349/33 |
| 2011/0285689 A1 | 11/2011 | Kim et al. | |
| 2014/0022210 A1 | 1/2014 | Wu | |
| 2015/0212377 A1* | 7/2015 | Imaoku | G02F 1/134363 349/42 |

FOREIGN PATENT DOCUMENTS

| | | |
|---|---|---|
| CN | 101477279 A | 7/2009 |
| CN | 101916010 A | 12/2010 |
| CN | 201780434 U | 3/2011 |
| CN | 102809843 A | 12/2012 |
| CN | 102937761 A | 2/2013 |
| CN | 103294246 A | 9/2013 |
| CN | 103529607 A | 1/2014 |
| KR | 10-2008-0024963 A | 3/2008 |

OTHER PUBLICATIONS

International Search Report PCT/CN2014/082424 in Chinese with English translation, mailed Oct. 21, 2014.
Notice of Transmittal of the International Search Report of PCT/CN2014/082424 in Chinese, mailed Oct. 21, 2014.
Written Opinion of the International Searching Authority of PCT/CN2014/082424 in Chinese with English translation mailed Oct. 21, 2014.
Chinese Office Action of Chinese Application No. 201310522636.8, mailed Jul. 2, 2015 with English translation.
Second Chinese Office Action in Chinese Application No. 201310522636.8, mailed Dec. 24, 2015 with English translation.

* cited by examiner

LIQUID CRYSTAL DISPLAY PANEL, DISPLAY APPARATUS AND METHOD FOR DRIVING THE DISPLAY APPARATUS

CROSS REFERENCE TO RELATED APPLICATIONS

This application is the National Stage of PCT/CN2014/082424 filed on Jul. 17, 2014, which claims priority under 35 U.S.C. §119 of Chinese Application No. 201310522636.8 filed on Oct. 29, 2013, the disclosure of which is incorporated by reference.

TECHNICAL FIELD

Embodiments of the present disclosure relate to display technical field, in particular, to a liquid crystal display panel, a display apparatus and a method for driving the display apparatus.

BACKGROUND

Thin film transistor liquid crystal displays (TFT-LCDs) dominate current flat panel display market due to its characteristics of small volume, low power consumption and no radiation.

Liquid crystal displays may be classified into Twisted Nematic (TN) type, In plane Switching (IPS) type and Advanced Super Dimension Switch (ADSDS or ADS) type according to the display mode. In an ADS type liquid crystal display, multi-dimensional electric field is formed by electric field generated at edges of slit electrodes in a same plane and electric field generated between a slit electrode layer and a planar electrode layer in the liquid crystal display. The electric fields are horizontal electric field. The horizontal electric field enable liquid crystal molecules in all orientation between the slit electrodes and right above the electrodes in liquid crystal cell to rotate/deflect, so that the efficiency of liquid crystal is improved and light transmission efficiency is increased. The Advanced Super Dimension Switch technique can improve the display quality of TFT-LCD, and have advantages such as high resolution, high transmittance, low power consumption, wide viewing angle, high aperture ratio, low chromatism, no push mura, and so on. According to various applications, the improved techniques of ADS technique include high transmittance I-ADS technique, high aperture ratio H-ADS technique and high resolution S-ADS technique, and so on.

In an ADS type liquid crystal display, multi-dimensional electric field is formed by electric field generated between a common electrode and a pixel electrode on array substrate. Horizontal electric field component of the multi-dimensional electric field enables liquid crystal molecules in all orientation between slit electrodes and right above the electrodes in liquid crystal cell to rotate/deflect. There are both vertical electric field component and horizontal electric field component in the multi-dimensional electric field of the ADS type liquid crystal display. The less the vertical electric field is, the better the display quality of the TFT-LCD is. High display quality is always the goal of manufacturers.

SUMMARY

Embodiments of the present disclosure provide a liquid crystal display panel, a display apparatus and a method for driving the display apparatus capable of improving display quality.

In order to achieve the above objective, an embodiment of the present disclosure comprises a first substrate and a second substrate opposite to each other and a liquid crystal layer between the first substrate and the second substrate.

The liquid crystal display panel further comprises a first common electrode disposed on a side of the first substrate close to the liquid crystal layer and a second common electrode disposed on a side of the second substrate close to the liquid crystal layer. A first pixel electrode and a second pixel electrode are disposed on the first substrate. The second common electrode has no overlap region directly facing the first pixel electrode and/or the second pixel electrode.

For example, the liquid crystal layer is positive liquid crystal layer made of positive liquid crystal molecules.

For example, an initial orientation of liquid crystal molecules in the liquid crystal layer is perpendicular to the first substrate or the second substrate.

For example, the first pixel electrode comprises one or more first sub-electrodes, and the second pixel electrode comprises one or more second sub-electrodes. The first sub-electrodes and the second sub-electrodes are arranged at intervals.

For example, the first pixel electrode and the second pixel electrode are disposed on a side of the first common electrode close to the liquid crystal layer and are insulated from the first common electrode by an insulating layer.

For example, the first pixel electrode is disposed on the same layer as the second pixel electrode.

For example, the first common electrode is a planar electrode.

For example, the first sub-electrode and/or the second sub-electrode are stripped electrodes.

For example, the liquid crystal display panel further comprises an dielectric layer disposed on a side of the first common electrode close to the liquid crystal layer.

For example, the liquid crystal display panel further comprises a first thin film transistor connected to the first pixel electrode and a second thin film transistor connected to the second pixel electrode.

An embodiment of the present disclosure provides a display apparatus comprising any one of the above mentioned liquid crystal display panels.

An embodiment of the present disclosure provides a driving method for driving the display apparatus, comprising: applying a first voltage and a second voltage to the first pixel electrode and the second pixel electrode, respectively; applying a third voltage and a fourth voltage to the first common electrode and the second common electrode, respectively. The first voltage, the second voltage and the third voltage are not equal to each other, and the first voltage, the second voltage and the fourth voltage are not equal to each other.

For example, the third voltage is equal to the fourth voltage.

To sum up, in the liquid crystal display panel according to embodiments of the present disclosure, a first pixel electrode and a second pixel electrode are disposed on a first substrate. A first common electrode is disposed on the first substrate, and a second common electrode is disposed on a second substrate. The second common electrode has no overlap region directly facing the first pixel electrode and/or the second pixel electrode. The first pixel electrode forms electric field with the second pixel electrode. The first and second pixel electrodes form electric field with the first common electrode, respectively. Meanwhile, the first and second pixel electrodes form electric field with the second common electrode, respectively. The electric field respectively generated between the first and second pixel electrodes and the second common electrode has no vertical electric field component. In this case, deflection degree of the liquid crystal molecules in the liquid crystal layer with respect to initial orientation may be increased, driving voltage of the liquid crystal display may be reduced, and display quality may be improved.

DETAILED DESCRIPTION

In order to make objects, technical solutions and advantages of the embodiments of the disclosure apparent, the technical solutions of the embodiment will be described clearly and fully in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiments of the present disclosure provide a liquid crystal display panel, a display apparatus and a method for driving the display apparatus capable of reducing the driving voltage of the liquid crystal display and improving display quality.

In at least one embodiment of the present disclosure provides a novel type of liquid crystal display panel. A first pixel electrode, a second pixel electrode and a first common electrode are formed on a first substrate. A second common electrode having no overlap region directly facing the first pixel electrode and/or second pixel electrode is disposed on a second substrate opposite to the first substrate. In such a manner, the deflection degree of the liquid crystal molecules in the liquid crystal layer with respect to the initial orientation can be increased, the driving voltage of the liquid crystal display can be reduced, and display quality can be improved.

It should be noted that the thicknesses of the functional layers shown in drawings of embodiments of the present disclosure does not indicate the real thickness or real relative thickness. Drawings of embodiments of the present disclosure are only used to schematically illustrate embodiments of the present disclosure.

Hereinafter, a liquid crystal display panel, a display apparatus and a method for driving the display apparatus according to embodiments of the present disclosure will be described in connection with the drawings.

In the following description, the partial schematic view of one sub-pixel in the liquid crystal display panel is provided as an example.

Figure 1:
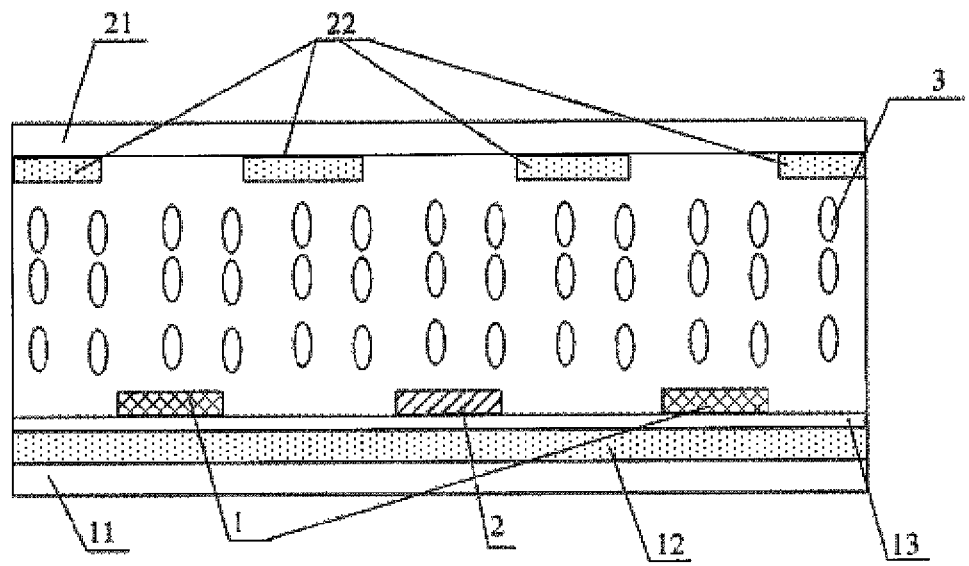
FIG. 1 is a structural schematic view of a liquid crystal display panel according to an embodiment of the present disclosure.

FIG. 1 is a structural schematic view of a liquid crystal display panel according to an embodiment of the present disclosure. The liquid crystal display panel includes a first substrate 11 and a second substrate 21 opposite to each other and a liquid crystal layer 3 between the first and second substrates 11 and 21. A pixel array (not shown in FIG. 1) is provided on the first substrate 11.

A first common electrode 12 is disposed on a side of the first substrate 11 close to the liquid crystal layer 3.

A second common electrode 22 is disposed on a side of the second substrate 21 close to the liquid crystal layer 3.

A first pixel electrode 1 and a second pixel electrode 2 are disposed on the first substrate 11. For example, a first pixel electrode 1 and a second pixel electrode 2 may be disposed in each sub-pixel region of the pixel array.

The second common electrode 22 has no overlap region directly facing the first pixel electrode 1 and/or second pixel electrode 2.

In the liquid crystal display panel according to an embodiment of the present disclosure, the liquid crystal layer is a positive liquid crystal layer composed of positive liquid crystal molecules.

The initial orientation of the liquid crystal molecules in the liquid crystal layer is perpendicular to the first substrate or the second substrate. FIG. 1 shows a schematic view of the distribution of liquid crystal molecules when the first common electrode 12, the second common electrode 22, the first pixel electrode 1 and the second pixel electrode 2 of the liquid crystal display panel are not applied with a voltage. The initial orientation of the liquid crystal molecules 3 is perpendicular to the first substrate 11 or the second substrate 21.

Figure 2:
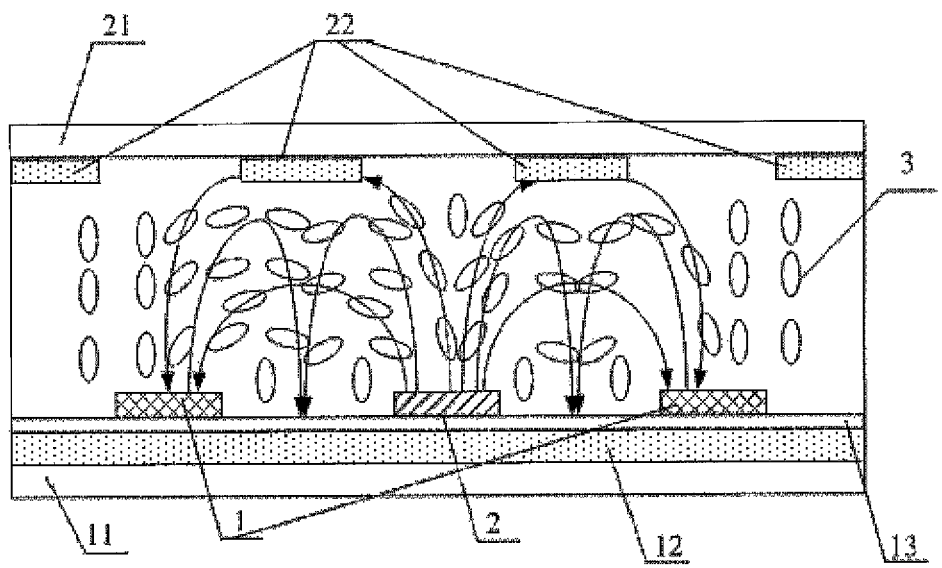
FIG. 2 is a structural schematic view of the electric filed generated in a liquid crystal display panel according to an embodiment of the present disclosure.

FIG. 2 is a schematic view of distribution of liquid crystal molecules when the first common electrode 12, the second common electrode 22, the first pixel electrode 1 and the second pixel electrode 2 of the liquid crystal display panel are respectively applied with a voltage. Lines with arrows in FIG. 2 indicate electric field lines. The first common electrode 12 generates horizontal electric field with the first pixel electrode 1 and the second pixel electrode 2, respectively. Horizontal electric field generates between the first pixel electrode 1 and the second pixel electrode 2. Inclined electric field is generated between the first and second pixel electrode 1 and 2 and the second common electrode 22.

Liquid crystal molecules are aligned and deflected from the initial orientation (direction perpendicular to the first substrate) by a certain angle, i.e., tend to align in a direction parallel to the first substrate 11. Vertical electric field between the second common electrode 22 and the first pixel electrode 1 and/or the second pixel electrode 2 according to embodiments of the present disclosure is less or even does not exist compared to the conventional structure because the second common electrode 22 have no overlap region directly facing the first pixel electrode 1 and/or second pixel electrode 2. Therefore, the liquid crystal molecules deflect by a greater degree with respect to the initial orientation where no voltage is applied. In the case that the driving voltage is fixed, the liquid crystal display panel has a greater light transmittance, and in the case that the light transmittance is fixed, the liquid crystal display panel has a lower driving voltage. The display quality is high accordingly.

It should be noted that the electric field lines shown in FIG. 2 are only used to schematically illustrate embodiments of the present disclosure, and do not indicate the real distribution of direction and density of electric field lines.

For example, the first pixel electrode and the second pixel electrode are disposed in a same layer.

For example, the first pixel electrode and the second pixel electrode are disposed on a side of the first common electrode close to the liquid crystal layer and insulated from the first common electrode through an insulating layer.

For example, the first common electrode is a planar electrode.

Hereinafter, the first pixel electrode, the second pixel electrode, the first common electrode and the second common electrode according to embodiments of the present disclosure are described in detailed.

Figure 3:
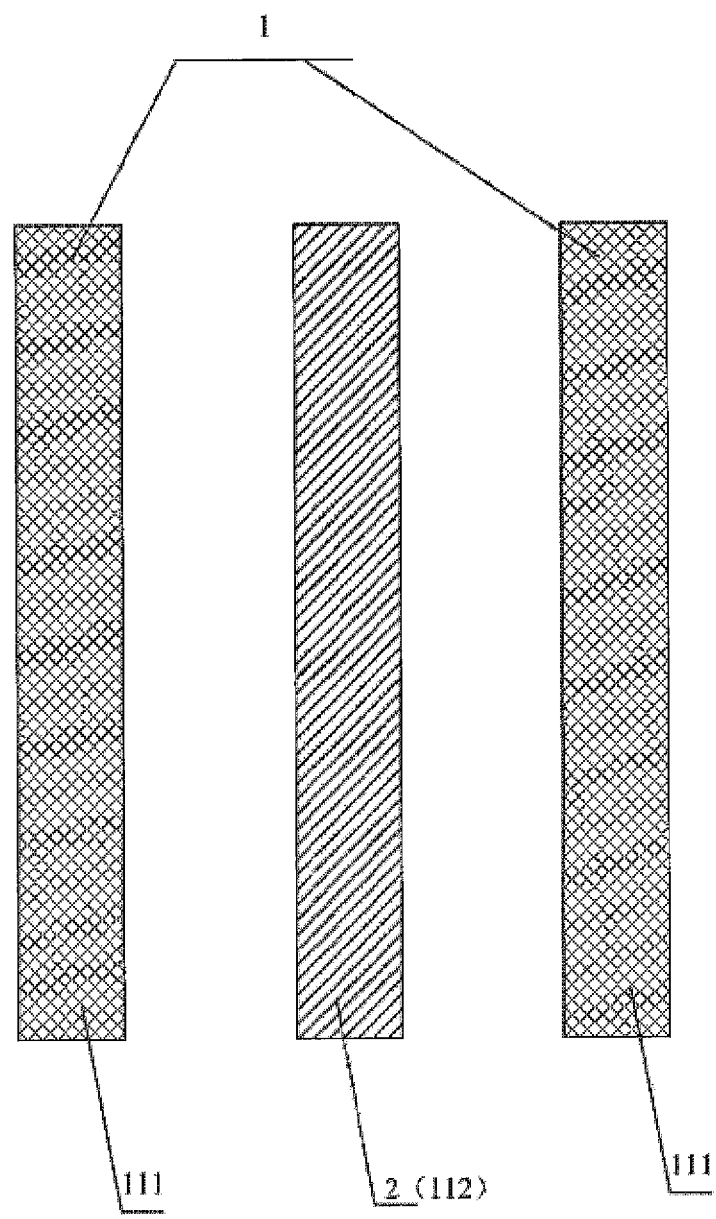
FIG. 3 is a structural schematic view of the a first pixel electrode and a second pixel electrode according to an embodiment of the present disclosure.

FIG. 3 is a top schematic view of the liquid crystal display panel shown in FIG. 1 in which only the first pixel electrode 1 and the second pixel electrode 2 are shown.

The first pixel electrode 1 includes one or more first sub-electrodes 111, and the second pixel electrode 2 includes one or more second sub-electrodes 112. The first sub-electrodes 111 and the second sub-electrodes 112 are arranged at intervals.

A horizontal electric field is generated between the first sub-electrode 111 and the second sub-electrode 112 which are spaced apart from each other. The liquid crystal molecules corresponding to these electrodes are distributed in multi-domains, thus the liquid crystal display panel has a wider viewing angle and a better display quality.

For example, the first sub-electrode 111 and the second sub-electrode 112 have striped shape, e.g., straight line "|", a bonded shape like a bracket "<" and so on.

For example, the first sub-electrodes 111 are aligned parallel to each other, and the second sub-electrodes 112 are aligned parallel to each other.

The first sub-electrode 111 and the second sub-electrode 112 of the present disclosure are not limited to those described in the above embodiments, and various arrangement manners may be applicable to the present disclosure as long as two sub-electrodes form the IPS mode.

Figure 4:
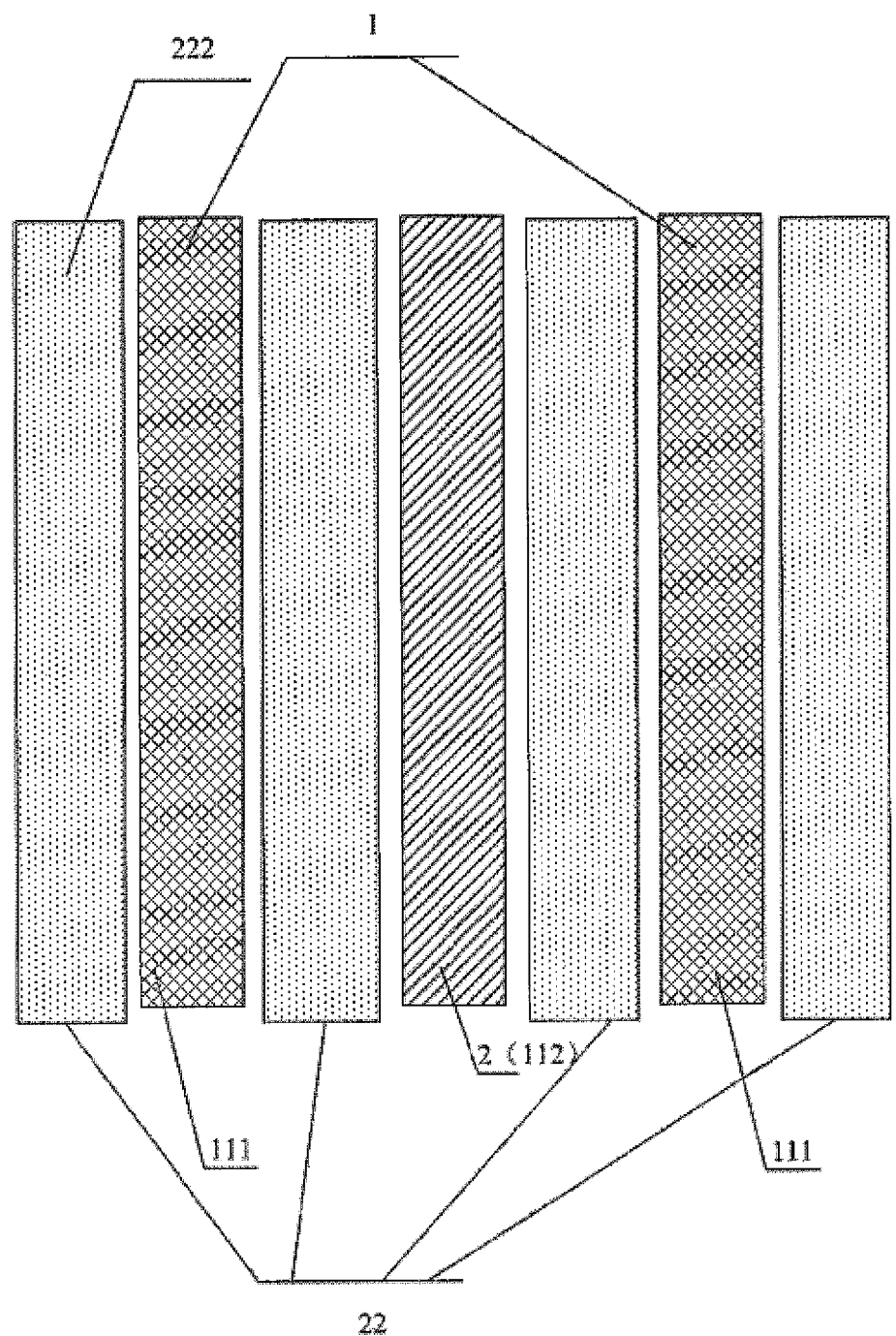
FIG. 4 is a structural schematic view of a first pixel electrode, a second pixel electrode and a second common electrode according to an embodiment of the present disclosure.

In order to clearly describe the positional relationship between the second common electrode 22 and the first and second pixel electrodes 1 and 2 shown in FIG. 1, description is provided in connection with FIG. 4.

FIG. 4 is a top schematic view of the liquid crystal display panel shown in FIG. 1 in which only the second common electrode 22, the first pixel electrode 1 and the second pixel electrode 2 are shown.

The second common electrode 22 includes a plurality of third sub-electrode 222. It can be seen clearly that the third sub-electrode 222 have no overlap region directly facing the first sub-electrode 111 and the second sub-electrode 112, and their projections are not overlapped with each other.

The first pixel electrode 1 and the second pixel electrode 2 may be driven by one thin film transistor or by two or more thin film transistors so as to ensure liquid crystal molecules right above the first pixel electrode 111 and the second pixel electrode 2 can be deflected, thus the property of viewing angle is improved and display quality is improved.

For example, voltages on the first pixel electrode and the second pixel electrode are not equal to each other. In implementation of the present disclosure, voltages on the first pixel electrode and the second pixel electrode are controlled by two thin film transistors TFT, respectively.

As shown in FIG. 4, the distance between the projection of the first sub-electrode 111 of the first pixel electrode 1 or the second sub-electrode 112 of the second pixel electrode 2 and the projection of the second common electrode 22 on a same plane is determined according to actual conditions and is not limited herein. For example, it is assumed that each of the first sub-electrode 111 and the second sub-electrode 112 has a width of 2.5 μm, and the distance between the first sub-electrode 111 and the second sub-electrode 112 is 4.5 μm, then the width of electrode portion of the second common electrode 22 disposed between the first sub-electrode 111 and the second sub-electrode 112 may be any size no greater than 4.5 μm as long as the second common electrode 22 has no overlap region directly facing the first sub-electrode 111 and/or second sub-electrode 112.

Because the second common electrode 22 has no overlap region directly facing the first pixel electrode 1 and/or the second pixel electrode, the second common electrode 22 has no overlap region directly facing the first sub-electrode 111 and/or second sub-electrode 112.

For example, the second common electrode 22 has no overlap region directly facing any one of the first sub-electrode 111 and second sub-electrode 112.

For example, the second common electrode, the first common electrode, the first pixel electrode and the second pixel electrode are made of a transparent conductive material, such as Indium tin oxide (ITO) or Indium Zinc Oxide (IZO) and so on.

The first common electrode and the first and second pixel electrodes may be disposed in various ways, for example, the first common electrode is disposed on the same layer as the first and second pixel electrodes or on different layer from the first and second pixel electrodes.

For example, the first common electrode is disposed on a different layer from the first and second pixel electrodes.

Referring to FIG. 1, on the first substrate 1, the first common electrode 12 is disposed on different layer from the first pixel electrode 1 and the second pixel electrode 2 and is insulated from the first pixel electrode 1 and the second pixel electrode 2 by a first insulating layer 13. The first common electrode 12 is disposed below the first pixel electrode 1 and the second pixel electrode 2. In one embodiment, the first common electrode 12 is disposed on the first substrate 1, the first insulating layer 13 is disposed on the first common electrode 12, and the first and second pixel electrodes (corresponding to the first and second pixel electrodes in respective sub-pixel 14) are disposed on the first insulating layer 13.

A liquid crystal display panel according to embodiments of the present disclosure is not limited to the above mentioned structure.

Figure 5:
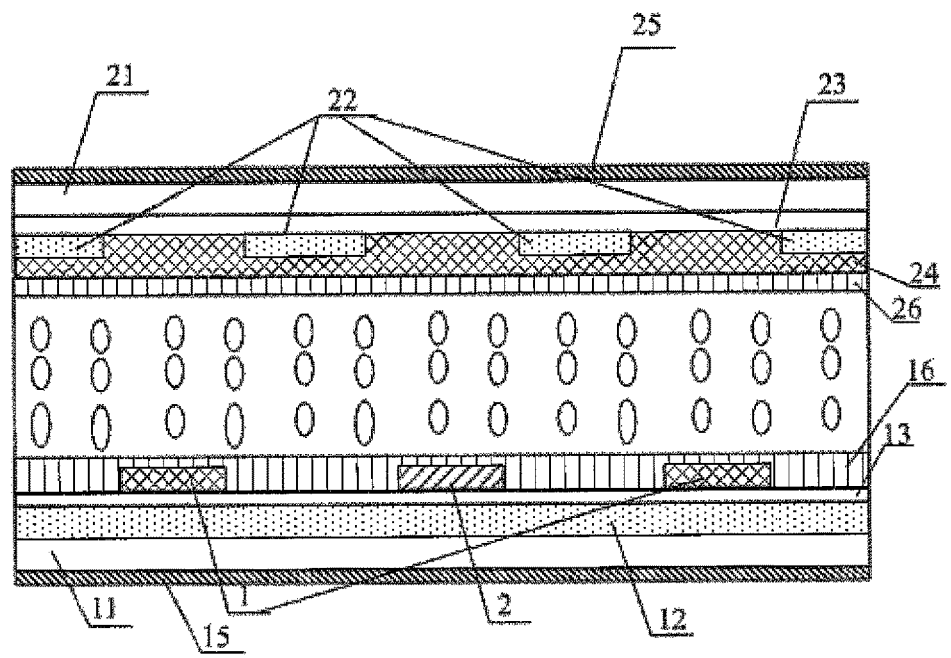
FIG. 5 is a structural schematic view of a liquid crystal display panel according to an embodiment of the present disclosure.

Referring to FIG. 5, liquid crystal display panel according to embodiment of the present disclosure further includes an dielectric layer (OC) 24 disposed on a side of the second common electrode 22 close to the liquid crystal layer 3 and covering the second substrate 21.

For example, the dielectric layer 24 may be an organic resin layer. The organic resin layer may protect second common electrode and drive liquid crystal molecules close to the dielectric layer to deflect more fully, so that display quality can be improved. A thickness of the dielectric layer relates to the deflection angle of the liquid crystal. An appropriate thickness may be selected for implementing embodiments of the present disclosure, which is similar to the conventional structure and will not be repeated here.

Figure 7:
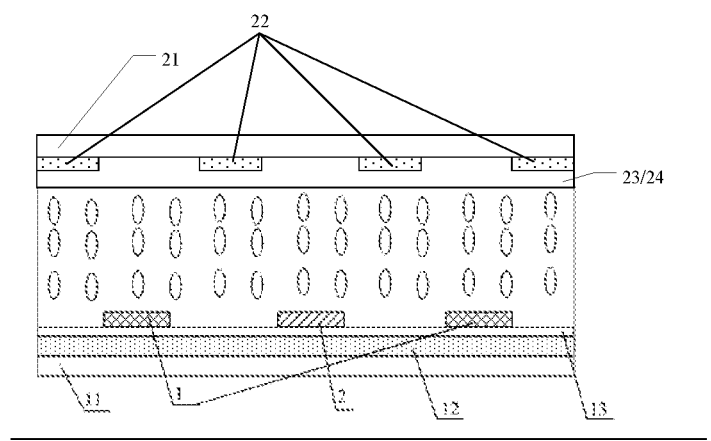
FIG. 7 is a structural schematic view of a liquid crystal display panel according to another embodiment of the present disclosure.

It should be noted that at least a color resin layer is disposed on the second substrate. As illustrated in FIG. 7, if the second common electrode 22 is disposed between the base substrate and the color resin layer on the substrate, an dielectric layer may not be separately provided, and the color resin layer is used as an dielectric layer.

For example, referring to FIG. 5, a liquid crystal display panel according to embodiments of the present disclosure may further include a first polarizing plate 15 disposed on a side of the first substrate 11 away from the liquid crystal layer 3 and a second polarizing plate 25 disposed on a side of the second substrate 21 away from the liquid crystal layer 3. The polarization directions of the first and second polarizing plates 15 and 25 are perpendicular to or parallel to each other. When light passing the liquid crystal molecules except the case that the light pass along the long axis of the liquid crystal molecule, the liquid crystal molecules may change the deflection direction of the light, that is, the liquid crystal molecules retard the phase of the light. The first and second polarizing plates allow light having passed through the liquid crystal layer with a retarded phase to exit to the emitting side of the liquid crystal display panel, so that image display is achieved.

For example, referring to FIG. 5, the liquid crystal display panel may further include a first alignment layer 16 disposed on a side of the sub-pixel 14 close to the liquid crystal layer 3, a color resin layer 23 disposed on the second substrate 21, and a second alignment layer 26 disposed on a side of the dielectric layer (OC) 24 close to the liquid crystal layer 3. The second common electrode 22 is disposed between the color resin layer 23 and the dielectric layer 24. The first and second alignment layers 16 and 26 are used to align the liquid crystal molecules in the liquid crystal layer 3 in the above-mentioned initial orientation when no electric field is applied. When there is no electric field between the first alignment layer 16 and the second alignment layer 26, the liquid crystal molecules are aligned according to orientation of the first and second alignment layers 16 and 26.

Since an embodiment of the present disclosure provides a novel type of liquid crystal display panel, there are horizontal electric field and inclined electric field in the liquid crystal layer. When the liquid crystal display panel is not driven, the initial alignment direction of positive liquid crystal molecule is perpendicular to the first and second substrates. Polarization direction of light is not changed when light passing the liquid crystal molecule. In this case, light cannot exit to the emitting side of the liquid crystal display panel through the second polarizing plate, and the liquid crystal display panel displays a black screen, i.e., in a normal black mode. When the liquid crystal display panel is driven, the first and second pixel electrodes generate a horizontal electric field with the first common electrode, respectively, and generate an inclined electric field with the second common electrode. In addition, a horizontal electric field is generated between the first pixel electrode and the second pixel electrode. Under action of the horizontal electric field, the alignment directions of the liquid crystal molecules which are initially aligned in the initial orientation deflect, and the long axis of the liquid crystal molecules form a certain angle with respect to the first substrate. The polarization direction of light is changed when light passing the liquid crystal molecules. In this case, the component of light, the polarization direction of which is along the polarization direction of the second polarizing plate, can pass the second polarizing plate to exit to the emitting side of the liquid crystal display panel, so that image display is achieved.

Figure 6:
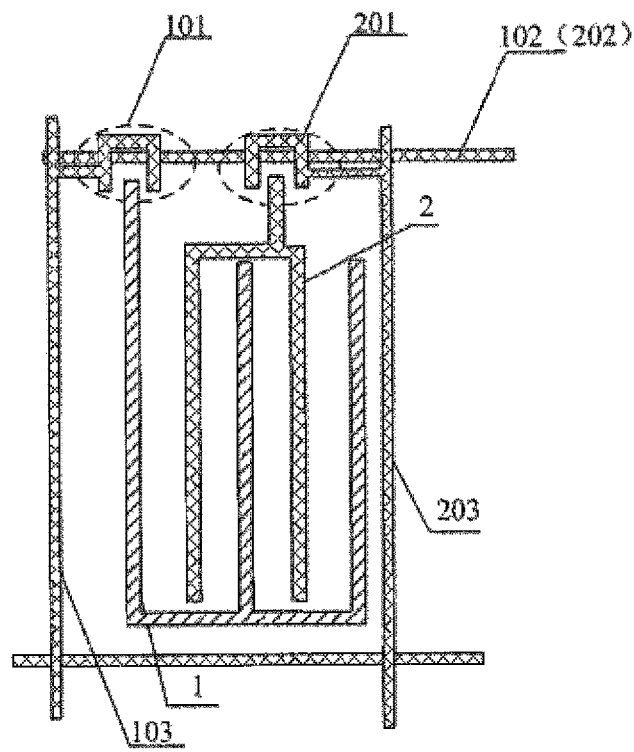
FIG. 6 is a structural schematic top view of an array substrate portion according to an embodiment of the present disclosure.

Referring to FIG. 6, the array substrate according to embodiments of the present disclosure may further include a first thin film transistor 101 connected to the first pixel electrode 1 and a second thin film transistor 201 connected to the second pixel electrode 2.

In particular, the drain electrode of the first thin film transistor 101 is connected to the first pixel electrode 1, and the drain electrode of the second thin film transistor 201 is connected to the second pixel electrode 2.

Further, the array substrate also includes a first gate line 102 connected to the gate electrode of the first thin film transistor 101, a first data line 103 connected to the source electrode of the first thin film transistor 101, a second gate line 202 connected to the gate electrode of the second thin film transistor 201, and a second data line 203 connected to the source electrode of the second thin film transistor 201.

The first and second thin film transistors 101 and 201 shown in FIG. 6 are not limited to the illustrated structures. Further, the thin film transistor may include an active layer between the source and drain electrodes and the gate electrode. Active layer is not shown in FIG. 6.

For example, the first gate line 102 and the second gate line 202 are the same gate line 102 (202).

That is to say, the region of one sub-pixel of the array substrate includes two pixel electrodes, thus two TFTs are needed to control the two pixel electrodes. FIG. 6 shows only one of various arrangement forms. The positions of the two TFTs in the sub-pixel may include other forms and will not be described.

An embodiment of the present disclosure also provides a display apparatus including a liquid crystal display panel according to any one of the above embodiments. The display apparatus may be a liquid crystal display panel, a liquid crystal display, a liquid crystal TV, and so on.

An embodiment of the present disclosure also provides a method for driving the above mentioned display apparatus, including the following steps: applying a first voltage and a second voltage to a first pixel electrode and a second pixel electrode, respectively; applying a third voltage and a fourth voltage to a first common electrode and a second common electrode, respectively. The first voltage, the second voltage and the third voltage are not equal to each other. The first voltage, the second voltage and the fourth voltage are not equal to each other.

For example, the third voltage is equal to the fourth voltage.

Hereinafter, the method for driving the above display apparatus will be described in details.

In the condition of taking one frame as the minimal period, voltages are applied to the first common electrode, the second common electrode, the first pixel electrode and the second pixel electrode, so that the second common electrode forms an inclined electric field with the first pixel electrode and the second pixel electrode, respectively, the first common electrode forms a horizontal electric field with the first pixel electrode and the second pixel electrode, respectively, and the first pixel electrode forms a horizontal electric field with the second pixel electrode.

For example, voltages of a same magnitude are applied to the first and second common electrodes.

For example, voltages of opposite polarities and a same magnitude are applied to the first and second pixel electrodes.

To sum up, in the liquid crystal display panel according to an embodiment of the present disclosure, the first and second pixel electrodes are disposed on the first substrate. The first common electrode is disposed on the first substrate, and the second common electrode is disposed on the second substrate. The second common electrode has no overlapping region vertically overlapping the first and second pixel electrodes. The first pixel electrode forms an electric field with the second pixel electrode, and the first and second pixel electrodes form an electric field with the first common electrode, respectively. Meanwhile, the first and second pixel electrodes form an electric field with the second common electrode, respectively. The electric fields respectively formed by the first and second pixel electrodes with the second common electrode have no vertical electric field, thus the horizontal electric field acting on the liquid crystal molecules is enhanced. Therefore, the horizontal electric field in the liquid crystal layer is enhanced, the driving voltage of the liquid crystal display is reduced, and display quality is improved.

It is obvious that various variations and modifications can be made to embodiments of the present disclosure without departing spirit and scope of the present disclosure. If those variations and modifications are within the protection scope defined by the claims and equivalent technique, the present disclosure is intended to include those variations and modifications.

This application claims priority from Chinese Patent Application No. 201310522636.8, filed on Oct. 29, 2013, in the Patent Office of China, the disclosure of which is incorporated herein in its entirety by reference.

What is claimed is:

1. A liquid crystal display panel, comprising:
   a first substrate and a second substrate opposite to each other and a liquid crystal layer between the first substrate and the second substrate;
   a first common electrode disposed on a side of the first substrate close to the liquid crystal layer; and
   a second common electrode disposed on a side of the second substrate close to the liquid crystal layer;
   wherein a first pixel electrode and a second pixel electrode are disposed on the first substrate, and the second common electrode has no overlap region directly facing the first pixel electrode and the second pixel electrode.

2. The liquid crystal display panel according to claim 1, wherein the liquid crystal layer is a positive liquid crystal layer made of positive liquid crystal molecules.

3. The liquid crystal display panel according to claim 2, wherein an initial orientation of liquid crystal molecules in the liquid crystal layer is perpendicular to the first substrate or the second substrate.

4. The liquid crystal display panel according to claim 1, wherein an initial orientation of liquid crystal molecules in the liquid crystal layer is perpendicular to the first substrate or the second substrate.

5. The liquid crystal display panel according to claim 1, wherein the first pixel electrode comprises one or more first sub-electrodes, the second pixel electrode comprises one or more second sub-electrodes, and the first sub-electrodes and the second sub-electrodes are arranged at intervals.

6. The liquid crystal display panel according to claim 5, wherein the first sub-electrode and/or the second sub-electrode are stripped electrodes.

7. The liquid crystal display panel according to claim 1, wherein the first pixel electrode and the second pixel electrode are disposed on a side of the first common electrode close to the liquid crystal layer and are insulated from the first common electrode by an insulating layer.

8. The liquid crystal display panel according to claim 7, wherein the first pixel electrode is disposed on the same layer as the second pixel electrode.

9. The liquid crystal display panel according to claim 7, wherein the first common electrode is a planar electrode.

10. The liquid crystal display panel according to claim 1, wherein the first pixel electrode is disposed on the same layer as the second pixel electrode.

11. The liquid crystal display panel according to claim 1, wherein the first common electrode is a planar electrode.

12. The liquid crystal display panel according to claim 1, further comprising a dielectric layer disposed on a side of the first common electrode close to the liquid crystal layer.

13. The liquid crystal display panel according to claim 12, wherein the dielectric layer is an organic resin layer.

14. The liquid crystal display panel according to claim 1, further comprising a first thin film transistor connected to the first pixel electrode and a second thin film transistor connected to the second pixel electrode.

15. The liquid crystal display panel according to claim 1, wherein the second common electrode comprises a plurality of third sub-electrodes.

16. The liquid crystal display panel according to claim 1, wherein at least a color resin layer is disposed on the second substrate.

17. The liquid crystal display panel according to claim 16, wherein the color resin layer acts as a dielectric layer where the second common electrode is disposed between a base substrate and the color resin layer on the second substrate.

18. A display apparatus comprising the liquid crystal display panel according to claim 1.

19. A driving method for driving the display apparatus according to claim 18, comprising:
   applying a first voltage and a second voltage to the first pixel electrode and the second pixel electrode, respectively; and
   applying a third voltage and a fourth voltage to the first common electrode and the second common electrode, respectively;
   wherein the first voltage, the second voltage and the third voltage are not equal to each other, and the first voltage, the second voltage and the fourth voltage are not equal to each other.

20. The driving method according to claim 19, wherein the third voltage is equal to the fourth voltage.

* * * * *